April 11, 1967 L. C. MURDOCK 3,314,009
CLAMP ON SYSTEM FOR MEASURING THE CHARACTERISTICS OF SEA WATER
Filed March 18, 1964
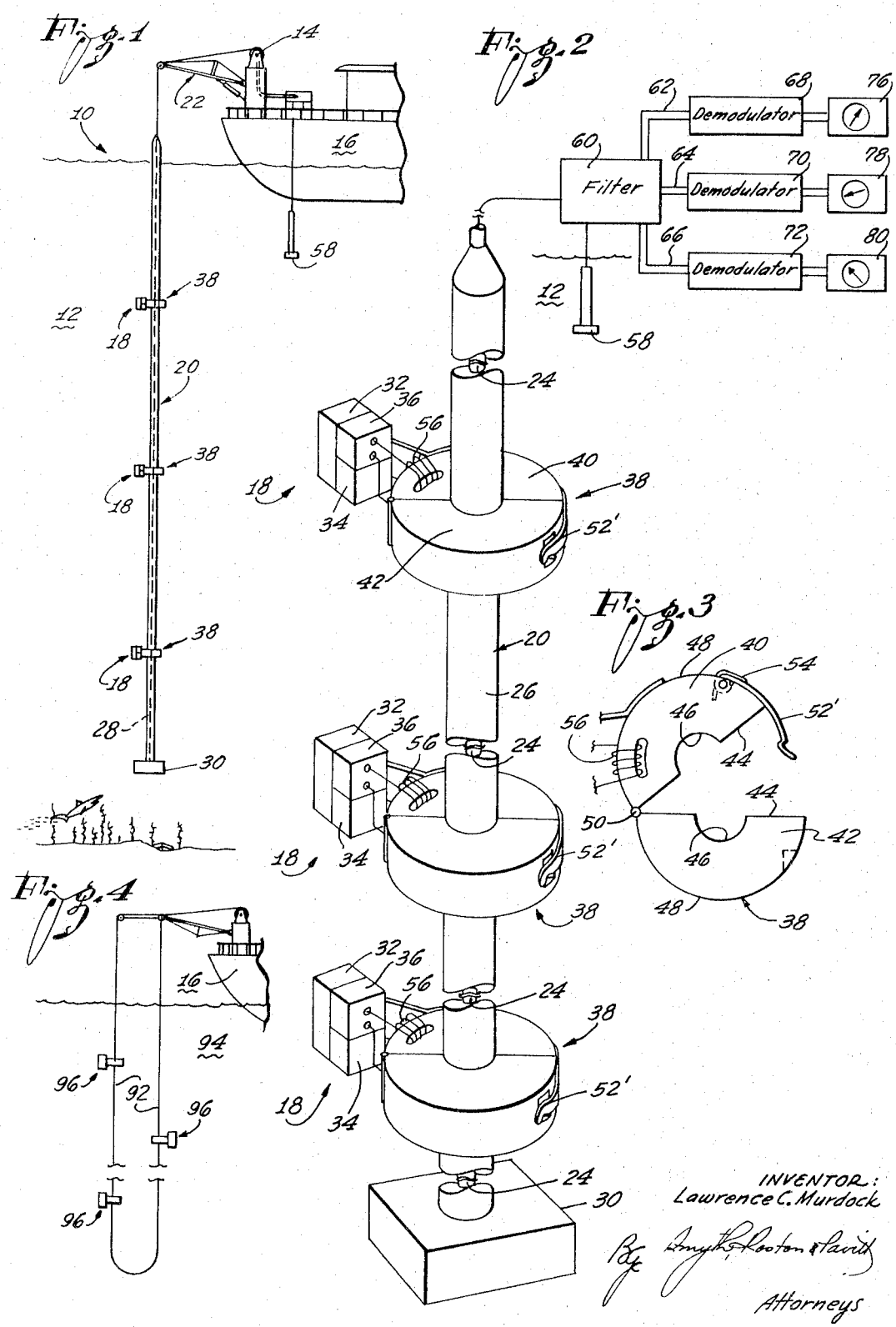
INVENTOR:
Lawrence C. Murdock
Attorneys United States Patent Office 3,314,009
Patented Apr. 11, 1967

3,314,009
CLAMP ON SYSTEM FOR MEASURING THE CHARACTERISTICS OF SEA WATER
Lawrence C. Murdock, San Diego, Calif., assignor to The Bissett-Berman Corporation, Santa Monica, Calif., a corporation of California
Filed Mar. 18, 1964, Ser. No. 352,885
12 Claims. (Cl. 325—51)

The present invention relates to means for measuring a plurality of the characteristics of an environment such as sea water at a plurality of separate locations.

At the present time, it is desirable to simultaneously measure and/or to monitor various characteristics of a medium such as sea water at a plurality of different locations. For example, it may be desirable to determine the temperature of the ocean at a variety of different depths or to determine other characteristics such as the salinity, pressure, speed or direction of any currents. One means of accomplishing this is to attach a plurality of suitable pickups to a cable suspended from a boat or buoy. Each of the pickups includes a transducer responsive to the characteristic to be measured and effective to provide an electrical signal that is a function of the characteristic. Each of the transducers is electrically interconnected with one or more conductors in the cable. The conductors are in turn interconnected with suitable instruments on the boat. In the event it is desirable to simultaneously measure a large number of characteristics, it is necessary to employ a correspondingly large number of transducers. Since each transducer must be electrically interconnected directly with an electrical conductor, it has been necessary to employ a large and bulky cable having a large number of conductors. In order to permit connecting the transducers to the conductors, it has been customary to provide suitable electrical connectors on the cable at preselected intervals whereby the transducers may be "plugged into" the cable. This inherently limits the disposition of the various transducers to specific locations corresponding to the positions of the various connectors. Very frequently, there are no connectors at the precise location at which is desired to measure a characteristic. In the event, it is necessary to precisely locate the pickup at a particular location, heretofore, it has been necessary to cut through the insulation on the cable to gain access to the conductors. This inherently requires a considerable amount of time and skill to accomplish and damages the cable whereby after repeated use, the cable becomes so severely damaged that it must be repaired or replaced.

The present invention provides a measuring system which overcomes the foregoing difficulties. More particularly, the present invention provides a measuring system employing a cable having very little bulk and easily handled and also permits simultaneously measuring a large number of characteristics at any desired locations without in any way damaging the cable. Furthermore, the system provides a plurality of separate pickups that may be easily attached to the cables at any desired locations with a minimum amount of skill and time. More particularly, the system employs a cable containing a single insulated conductor and a plurality of separate pickups that may be attached to the cable at any desired location by means of clamps. Each clamp includes a pair of magnetic members which fit around the cable and form a magnetic circuit which surrounds the conductor in the cable. The transducer is interconnected with a coil which is wound upon one of the clamp members to produce a flux field which encompasses the conductor and induces a corresponding signal in the cable. It will thus be seen that since the pickup is not electrically interconnected with the conductor, the pickup may be located at any point on the cable and may be rapidly attached or detached at any location without in any way damaging the cable.

These and other features and advantages of the present invention will be readily apparent from the following detailed description of a limited number of embodiments particularly when taken in connection with the accompanying drawings wherein like reference numerals refer to like parts and wherein:

FIGURE 1 is a view of a measuring system embodying one form of the present invention and adapted to measure a plurality of characteristics of sea water at a plurality of different locations;

FIGURE 2 is a combination perspective and diagrammatic view of the system of FIGURE 1 showing a plurality of pickups for sensing the characteristics and a receiving station for receiving signals from the pickups;

FIGURE 3 is a view of a clamp for one of the pickups in FIGURE 2; and

FIGURE 4 is a view similar to FIGURE 1, but showing a measuring system employing a modification of the present invention.

Referring to the drawings in more detail, the present invention is particularly adapted to be embodied in a measuring system 10 for measuring or monitoring various characteristics of the sea water 12 at a plurality of different locations. More particularly, the present system 10 employs a receiving station 14 which may be mounted on a buoy or boat 16 disposed on the surface of the ocean 12, a plurality of pickups 18 adapted to be immersed in the sea water 12 and responsive to the various characteristics thereof to produce electrical signals and a cable 20 which supports the pickups 18 and interconnects them with the receiving station 14.

One end of the cable 20 may be mechanically attached to a support 22 on the boat 16 to hang therefrom. The boat 16 is positioned so that the suspended cable 20 will extend downwardly through each of the locations at which it is desired to measure a particular characteristic. The present cable 20 includes a single center conductor 24 which extends the entire length of the cable 20. This conductor 24 may be a single solid wire or a plurality of strands, has a low electrical resistance so that it will be capable of carrying an electrical current with a minimum amount of loss.

An outer layer 26 of insulation is provided on the cable 20 to completely surround or encase the electrically conductive center conductor 24 and maintain it electrically separated from the sea water 12. This insulating layer 26 includes a material that is impervious to sea water and is effective to withstand abrasion, etc.

The upper end of the conductor 24 is electrically interconnected with the receiving station 14 so as to transfer any electrical currents in the cable 20 through the receiving station 14. The lower end 28 of the center conductor 24 may extend beyond the insulation 26 and into intimate electrical contact with the sea water 12. If desired, an enlarged electrode 30 may be attached to the conductor 24 so as to reduce the amount of electrical resistance between the conductor 24 and sea water 12 and to provide a weight for maintaining the cable 20 vertical.

The various pickups 18 may be attached to the cable 20 at any preselected locations. When the cable 20 is suspended in the ocean 12, each of the pickups 18 will thus be disposed at the precise location or depth at which it is desired to measure a particular characteristic. Each pickup 18 includes a transducer 32 responsive to the particular characteristic to be sensed by the pickup 18. For example, if it is desired to measure the temperature of the sea water 12, the transducer 32 may include a thermistor or similar device responsive to the temperature and effective to provide an electrical signal which is a function of the temperature. If it is desired to measure the pressure, the pickup 18 may include a pressure gauge that will produce a signal which is a function of the pressure of the water. Similarly, if it is desired to measure the salinity, velocity or direction of any current in the water, etc., the transducers 32 may include means responsive to these various characteristics.

The various transducer signals are normal D.C. signals. For reasons that will become apparent subsequently, each of the pickups 18 includes means that will convert the D.C. transducer signal into a suitable A.C. signal. In the present instance, these means include a signal generator 34 effective to generate a carrier wave of some preselected frequency. Although the frequency may be of any desired amount, it should be suitable for use as a carrier wave for the transducer signal. It has been found desirable to employ a frequency in the so-called audio range, for example, in a range on the order of about 5 to 10 kilocycles. However, if desired, the frequencies may extend up to and even beyond 100 kilocycles or may be in the so-called radio frequency ranges. The frequency of the signal produced in each generator 34 differs from the signals produced by the generators in all of the other pickups 18. As a result, the carrier waves from the pickups 18 will all be unique and easily identified.

Each pickup 18 also includes a suitable modulator 36 electrically interconnected with the transducer 32 and signal generator 34. The modulator 36 is effective to modulate the carrier wave signal with a component that corresponds to the signal generated by the transducer. It may thus be seen that each of the pickups will be effective to produce an alternating current signal which includes a carrier wave modulated by a transducer signal.

For purposes of explanation, each pickup is described as having a separate transducer 32, carrier wave generator 34 and modulator 36. However, it should be understood that one or more of these elements may be combined with another. Furthermore, any form of modulation such as amplitude modulation, frequency modulation, etc. may be employed. More particularly, it has been found desirable under some circumstances to provide a carrier wave that is frequency modulated in that the frequency of the wave is a function of the magnitude of the characteristic sensed by the transducer.

Each of the pickups also includes a fastening means for attaching the pickup 18 onto the cable 20. In the present instance, the fastening means is in the form of a clamp 38 that may be attached to the cable 20 at any preselected location without in any way physically altering the cable 20 or in any way damaging the continuity of the conductor 24 or of the insulation 26 which separates the conductor 24 from the sea water 12. The clamp 38 includes a pair of members 40 and 42 which are very similar to each other. Each member 40 and 42 includes a plain face 44 that is adapted to mate with the face 44 on the other member. A semi-cylindrical opening 46 is provided in each of the faces. Each of the openings is positioned to mate or register with the opening in the face of the other member. Thus, when the two members are mated with each other, the two faces will be in intimate contact and the two openings will form a cylindrical passage. For reasons that will become apparent subsequently, it is desirable for the two faces 44 to intimately engage each other whereby there will be little or no air gap between the faces 44. Each of the members 40 and 42 includes a substantial cylindrical exterior 48 which is concentric with the opening 46 formed in the face 44.

Means are provided for attaching the two members 40 and 42 together. In the present instance, this means includes a hinge 50 located on each member 40 and 42 adjacent to the extremity of the faces 44. This hinge 50 will be effective to permit the two members 40 and 42 to swing relatively to each other between an open position and a closed position. A latch 52′ such as a snap spring 54 is mounted on one member 40 so as to engage the other member 42 and retain them locked in a closed position. However, this latch 52 is effective to permit the two members 40 and 42 to be readily locked and unlocked so that they can be quickly moved between the open and closed positions.

When the two members 40 and 42 are moved into the open position similar to that shown in FIGURE 3, they are separated by a sufficient space to permit the cable 20 to pass between the two members 40 and 42 and to fit into one of the openings 46 in a face 44. However, when the two members 40 and 42 are moved to the closed position as seen in FIGURE 2 and particularly when they are locked in the closed position by the latch 52′ the registering openings 46 will form a passage with an inside diameter that is slightly less than the outside diameter of the insulation 26 surrounding the cable 20.

When the latch 52′ secures the two members 40 and 42 together, the layer 26 of insulation is firmly compressed between the two members 40 and 42. It will thus be seen that the clamp 38 is effective to securely attach the pickup 18 onto the cable 20. It may be noted that when attaching the pickup 18 to the cable 20 in this manner there is no damage to the insulation 26 and no direct electrical connection is made with the electrical conductor 24 in the center of the cable 20. As a result, the pickups 18 may be repeatedly attached and detached from the cable 20 without in any way damaging the cable 20. Also, since the two members 40 and 42 may be easily moved between their open and closed positions, the pickup 18 may be very easily and very readily attached to the cable 20 by even an inexperienced person.

Means are provided on each pickup 18 or clamp 38 for coupling the modulated carrier wave from the modulator 36 into the center conductor 24. In the present instance, this means includes a coil 56 which is electrically interconnected with the modulator 36 so as to carry the modulated carrier wave produced within that particular pickup 18. The coil 56 is wound around at least a portion of at least one of the two core members 40 and 42 in the clamp 38. Each of the clamp members 40 and 42 includes a magnetically permeable material that will form a closed magnetic loop which extends around the center conductor 24. As a result, when a current is produced in the coil 56, a magnetic flux field will be created in the two clamp members 40 and 42. The magnetic loop completely surrounds the cable 20 and as a consequence completely encircles the center conductor 24. As a result, the modulated carrier wave current flowing in the coil 56 will induce a corresponding current into the center conductor 24. The two core members 40 and 42 have a sufficiently large area and are separated by little or no air gap so that the magnetic loop will have a minimum reluctance and a large amount of magnetic flux.

The receiving station 14 is located on the boat 16 and is electrically interconnected with the center conductor 24 so as to receive the current signals in this conductor 24. One side of the receiving station 14 may be grounded to the boat 16 or electrically interconnected with a probe 58 that is immersed in the sea water 12 and in electrical contact therewith. The immersed probe 58, sea water 12 and exposed electrode 30 on the lower end of the cable 20 will thereby form a return path for the electrical conductor 24. The conductor 24 and its return path form a closed loop that extends through the flux fields in each core 40 and 42. The loop will thereby act as a secondary winding in a plurality of transformers, each of which includes a primary winding 56 on a core.

The receiving station 14 includes filter means 60 that has one side connected to the center conductor 24 and the other side connected to the probe 58. The filter 60 thereby receives all of the modulated carrier waves circulated around the closed loop formed by the cable 20 and sea water 12. The filter means 60 includes a separate section for each of the pickups 18. Each of the sections is of the bandpass variety tuned to one of the carrier wave signals and discriminates against all of the other carrier waves. A pair of output conductors 62, 64 and 66 extends from each of the sections and carries a single carrier wave modulated by a transducer signal from a particular pickup 18.

A demodulator 68, 70 and 72 is electrically connected to each pair of output conductors 62, 64 and 66. The demodulators 68, 70 and 72 are effective to demodulate the signal and suppress the carrier wave and leave only the transducer signal.

Suitable indicating meters and/or recorders 76, 78 and 80 are interconnected with the outputs of the demodulators 68, 70 and 72. Each of the meters and/or recorders 76, 78 and 80 is responsive to the transducer signal from the demodulator and is calibrated in units corresponding to the characteristic being sent by the particular pickup unit.

In order to use the present invention for measuring a plurality of characteristics of the sea water 12, the cable 20 may be lowered from a boat 16 to descend into the sea 12 and be suspended from the boat 16. As the cable 20 is being lowered into the sea 12, each time a point is reached that will be positioned at a particular location an appropriate pickup 18 is attached to the cable 20. This is accomplished by releasing the spring latch 52' and separating the two members 40 and 42 into the open position. Both of the members 40 and 42 are then passed over the cable 20 and the cable 20 is positioned in one of the openings 46. The two members 40 and 42 are then returned to the closed position and locked together by the spring latch 52'.

The insulation 26 on the cable 20 will then be compressed between the two members 40 and 42. As a result, the core and pickup 18 will be firmly attached to the cable 20 at the desired location. Since the pickup 18 can be readily attached and detached by merely opening and closing the two clamp members 40 and 42, the pickup 18 can be attached to the cable 20 very quickly by even an unskilled person. Moreover, since no damage is done to the insulation 26 or center conductor 24 in the cable 20, the pickup 18 may be attached to the cable 20 at any desired location. When the cable 20 has been fully lowered into the ocean 12, each of the various pickups 18 will be very precisely disposed at the exact location where it is desired to sense a particular characteristic.

After the pickups 18 are attached to the cable 20 and located at their respective locations, the center conductor 24 together with the probe 58 and sea water 12 form a closed electrically conductive loop having portions disposed within the magnetic flux field emanating from each of the various primary windings 52. Each of the transducers 32 produces an electrical signal having a magnitude which is a function of its characteristic at its particular location. The modulators 36 then modulate the carrier waves from the generators 34 with the transducer signals and cause the modulated carrier wave signals to circulate through the primary windings 56 on the core members 40 and 42. This produces alternating flux fields in the cores which encompass the cable 20 and in turn induce corresponding signals in the center conductor 24. Each of the pickups 18 will thus induce an unique signal in the cable 20 which includes a modulated carrier wave having a frequency which is distinctly different from the frequencies of all of the other carrier waves.

The various signals induced into the center conductor 24 flow through the filter 60, probe 58 and sea water 12 to the electrode 30 on the lower end of the center conductor 24. As the various currents flow through the filter 60, the filter sections will be effective to separate each of the modulated carrier waves from the rest of the carrier waves and supply the carrier waves to its respective demodulator 68, 70 and 72. The demodulators 68, 70 and 72 will then separate out the respective transducer signals and supply them to the various indicating means and/or recorders 76, 78 and 80.

As an alternative, the embodiment 90 of FIGURE 4 may be employed. In this embodiment 90, both ends of the center conductor are electrically interconnected with the opposite sides of the filter. As a result, when the cable 92 is lowered into the ocean 94, it will form a loop having both ends suspended from the surface of the ocean 94. When fully lowered, the various portions of the cable 92 pass through the various locations at which it is desired to measure the various characteristics. In the process of lowering the cable 92 into the ocean 94, the various pickups 96 are attached to the cable 92 in the manner described above. It will thus be seen that each of the pickups 96 will be effective to induce appropriate signals into the center conductor. These signals will then flow through the receiving station where they will be separated, demodulated and supplied to the various indicating means and/or recorders.

While only a limited number of embodiments of the present invention are disclosed and described herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

What is claimed is:

1. In combination for measuring characteristics of sea water,
   a cable having an electrically conductive center conductor and having electrical insulation enveloping the electrically conductive center conductor and constructed to be immersed in the sea water;
   pickup means removably attached to the cable for disposition in the sea water, said pickup means being constructed to be responsive to produce magnetic flux for inducing electrical signals in the central conductor of the cable;
   transducer means in said pickup means and responsive to the characteristics of the sea water at the location of the pickup means to generate an electrical signal having characteristics dependent upon the characteristics of the sea water; and
   winding means electrically interconnected with the transducer means and magnetically coupled to the pickup means to produce magnetic flux in the pickup means in accordance with the characteristics of the electrical signal generated in the transducer means.

2. The combination set forth in claim 1 wherein the pickup means is constructed of at least two portions pivotally movable between a first position clamping the pickup means to the cable and a second position providing for the removal of the pickup means from the cable and wherein the pickup means includes means for clamping the two portions of the pickup means in the first pivotal position of the cable.

3. In combination for measuring characteristics of sea water,
   a cable having an electrically conductive center conductor and an outer layer of insulation enveloping the center conductor and electrically insulating the center conductor from the sea water;

a pickup removably attached to the cable at a position adjustable on the cable;

means included in the pickup for clamping the pickup to the cable;

a transducer on the pickup and responsive to the characteristics of the sea water to generate an electrical signal having characteristics dependent upon the characteristics of the sea water;

the pickup including a magnetically permeable core constructed to produce magnetic flux and enveloping said cable to induce electrical signals in the center conductor of the cable in accordance with the magnetic flux in the core; and winding means interconnected with the transducer to receive the electrical signal generated by the transducer, the winding means being wound upon the magnetic core to obtain the production of magnetic flux in the core in accordance with the characteristics of the signal received by the winding means.

4. The combination set forth in claim 3 wherein the pickup includes first and second portions having inner surfaces conforming to the outer layer of insulation on the cable and pivotable relative to each other between a first position with their inner surfaces snugly enveloping the outer layer of insulation on the cable and a second position for providing a removal of the pickup from the cable and the clamping means in the pickup clamps the first and second portions in the first position of the portions.

5. In combination for measuring characteristics of sea water, a cable having an electrically conductive center conductor and an outer layer of insulation enveloping the electrically conductive center conductor to electrically isolate the center conductor from said sea water, said cable being constructed to be immersed in the sea water;

a magnetically permeable core having characteristics of producing magnetic flux and removably attached to said cable, said core enveloping said cable in magnetically coupled relationship to said center conductor to induce an electrical signal in the center conductor in accordance with the magnetic flux in the core;

a transducer attached to said core and responsive to the characteristics of the sea water to provide an electrical signal having characteristics dependent upon the characteristics of the sea water; and a primary winding wound upon the core and electrically connected to the transducer to receive the electrical signal generated by the transducer and to obtain the production of magnetic flux in the core in accordance with the characteristics of the electrical signal.

6. The combination set forth in claim 5 wherein the core is defined by two portions movable relative to each other between a first position for attachment of the core to the cable and a second position for removal of the core from the cable and wherein means are provided for clamping the core to the cable in the first position of the first and second portions.

7. In combination for measuring characteristics of sea water, a cable having an electrically conductive center conductor and an outer layer of insulation enveloping the center conductor to electrically isolate the center conductor from said sea water, said cable being constructed to be immersed in the sea water;

a receiving station electrically interconnected with one end of said center conductor;

a pickup removably attached to the cable at a particular position along the cable;

transducer means supported by the pickup and responsive to the characteristics of the sea water to generate an electrical signal having characteristics dependent upon the characteristics of the sea water at the particular position;

signal-inducing means interconnected with the pickup and disposed relative to said center conductor to induce in the center conductor a signal having characteristics dependent upon the characteristics of the signal generated by the transducer means; and a return probe interconnected with the receiving station and disposed in the sea water to form a return path extending through the sea water between said probe and said end of the cable opposite to the first end.

8. The combination set forth in claim 7 wherein the signal-inducing means includes a magnetic core having characteristics of producing a magnetic flux and of inducing a signal in the center conductor of the cable in accordance with such magnetic flux and wherein a winding extends through the pick-up and is connected to the transducer means to receive the signal generated by the transducer means and to obtain the production of magnetic flux in the core in accordance with the characteristics of such signal.

9. The combination set forth in claim 7 wherein the pickup includes first and second portions movable relative to each other between a first position for clamping of the pickup to the cable and a second position for removal of the pickup from the cable and wherein clamping means are disposed on the first portion for clamping the first portion to the second portion in the first position of the first and second portions to retain the pickup on the cable.

10. In combination for measuring a plurality of characteristics of sea water, a cable having an electrically conductive center conductor and an outer layer of electrical insulation enveloping the center conductor, said cable being constructed to be immersed in the sea water;

a receiving station electrically interconnected with one end of said conductor;

a plurality of pickups each attached to the cable at a different position along the cable, transducer means in each of the pickups, the transducer means being responsive to the characteristics of the sea water at its individual position to produce a first electrical signal having characteristics dependent upon the particular characteristics of the sea water being measured;

a plurality of modulating means each connected with a different one of the transducing means to produce a second electrical signal modulated in accordance with the characteristics of the first electrical signal;

a plurality of signal-inducing means each interconnected with a different one of the modulating means and coupled to the center conductor in the cable to induce a signal in the center conductor in accordance with the characteristics of the electrical signal from the associated one of the modulating means;

a return probe interconnected with the receiving station and disposed in the sea water to form an electrical return path between the probe and the end of the center conductor opposite to the first end; and a plurality of demodulating means at the receiver for individually recovering from the plurality of the second electrical signals the information representing the different characteristics of the sea water.

11. The combination set forth in claim 10 wherein each of the pickups is provided with first and second portions movable relative to each other between a first position for clamping of the pickup to the cable and a second position for removal of the pickup from the cable and wherein means are provided on one of the first and second portions for clamping the pickup to the cable in the first position of the cable.

12. The combination set forth in claim 11 wherein each of the signal-inducing means includes a core having properties of producing magnetic flux and wherein the core is disposed relative to the center conductor of the cable to induce a signal in the cable in accordance with the characteristics of the flux produced by the core and wherein a plurality of winding means are provided each disposed on the pickup relative to the associated core and each connected to an associated one of the modulating means to produce flux in the core in accordance with the characteristics of the electrical signal from the modulating means.

References Cited by the Examiner

UNITED STATES PATENTS

| | | | |
|---|---|---|---|
| 1,382,590 | 6/1921 | Ziegler | 325—28 |
| 1,697,462 | 1/1929 | Grant | 179—2.5 X |
| 1,800,474 | 4/1931 | Scherer | 324—127 |
| 2,341,519 | 2/1944 | Atkinson. | |
| 2,488,400 | 11/1949 | Harder | 179—2.5 |
| 3,214,728 | 10/1965 | Higgins. | |
| 3,253,215 | 5/1966 | Moakler et al. | 324—127 X |

JOHN W. CALDWELL, *Acting Primary Examiner.*